3,250,759
CITRULLINE CONTAINING PEPTIDES
Miklos Bodanszky, Princeton, and Michael Angel Ondetti, Highland Park, N.J., assignors to Olin Mathieson Chemical Corporation, New York, N.Y., a corporation of Virginia
No Drawing. Filed Aug. 18, 1961, Ser. No. 132,298
16 Claims. (Cl. 260—112.5)

This invention relates to new peptides and more particularly to citrulline containing peptides.

Prior to this invention many peptides had been synthesized. No synthetic peptide had been prepared, however, which contained citrulline as one of its amino acids. It has now been found that not only can such citrulline containing peptides be prepared but that certain of such peptides are biologically active. It has further been found that all such citrulline containing peptides are useful as intermediates in the preparation of more complex citrulline containing peptides.

It is one object of this invention, therefore, to provide a new class of chemical compounds, the citrulline containing peptides.

It is another object of this invention to provide new compounds which are useful either for their own biological activity or as intermediates in the preparation of more complex biologically active substances.

In its broadest aspects this invention relates to peptides containing at least two amino acids, at least one of which is citrulline. More specifically this invention relates to peptides containing from two to about twenty-four amino acids, at least one of which is citrulline.

Specifically, the invention provides new peptides which are related to biologically active peptides found in nature with the exception that arginine, lysine or leucine moieties are replaced by a citrulline moiety.

For the preparation of citrulline containing peptides this invention provides intermediates of two types: peptides or protected peptides with citrulline as their C-terminal amino acid and peptides or protected peptides with citrulline as their N-terminal amino acid.

The citrulline containing peptides of this invention are prepared in the usual manner for the preparation of peptides by condensing the desired amino acids or short chain peptides. This process of this invention differs from those in the prior art, however, in that at least one step in the preparation of the peptides of this invention citrulline or a partially blocked form of citrulline is employed as the reactant. This partially blocked form of citrulline can be either a citrulline containing peptide or citrulline itself containing a protecting group.

Thus, if an N-terminal citrulline containing peptide is desired, an ester of Nα-benzyloxycarbonyl-L-citrullinate, new compounds of this invention, may be used as the reactants. These esters are prepared in two steps, by first reacting L-citrulline with benzylchloroformate in a basic medium (e.g., an aqueous alkali solution) whereby Nα-benzyloxycarbonyl-L-citrulline is obtained; and then reacting the Nα-benzyloxycarbonyl-L-citrulline with an alcohol, preferably in the presence of dicyclohexylcarbodiimide, whereby the desired ester is formed. Although any alcohol can be used, the preferred alcohols are the lower alkanols (e.g., methanol, ethanol and propanol), the monocyclic phenols (e.g., phenol, o, p, and m-nitrophenol and thiophenol), cyanomethanol and hydroxyphthalimide. Particularly preferred is p-nitrophenyl Nα-benzyloxycarbonyl-L-citrullinate; however, other acyl or alkyl groups commonly used in peptide synthesis, such as phthalyl, trifluoroacetyl, butyloxycarbonyl, trityl, diphenylmethyl and benzyl groups, can also be used for the protection of the amino group.

If a C-terminal citrulline containing peptide is desired, citrulline itself or an ester thereof, such as methyl L-citrullinate, may be used as reactants. These esters are prepared by esterification of citrulline with the desired alcohol. Other activated crabonyl groups, such as the acyl chloride, azide and mixed anhydrides, can also be employed.

In addition to dicyclohexylcarbodiimide, other known condensing agents used in peptide synthesis, such as carbonyl diimidazole and methoxyacetylene, are also useful in the coupling of peptides containing citrulline.

Any of the known amino acids, in either their D or L form or mixtures thereof, can be used as the other components in the peptides of this invention. As used in this specification, the term "amino acid" is meant to includes citrulline and the twenty-two amino acids: alanine, arginine, aspartic acid, crysteine, diiodotyrosine, glutamic acid, gylcine, histidine, hydroxylysine, hydroxyproline, isoleucine, leucine, lysine, methionine, phenylalanine, proline, serine, threonine, thyroxine, tryptophan, tyrosine and valine.

To prepare the N-terminal citrulline containing peptides, the Nα-benzyloxycarbonyl-L-citrullinate ester is reacted with the desired amino acid or peptide, the reaction preferably being conducted in the presence of a base such as pyridine. If an amino acid is employed as the reactant, a dipeptide is formed, with the citrulline as the N-terminal amino acid. This dipeptide may then be used to react with another amino acid to form a tripeptide. If the third amino acid is to be added to the amino group of the citrulline radical, the benzyloxycarbonyl protective group is first removed, as by treatment with hydrogen bromide in acetic acid or sodium in ammonia, or by catalytic hydrogenolysis. If the third amino acid is to be added to the carboxyl end of the second amino acid, the protective group is of course retained and the addition is made in the manner known in the art. In this way peptides of any number of amino acids, containing one or more citrulline substituents in any desired position can be prepared.

To prepare the C-terminal citrulline containing peptides, a protected amino acid activated on its carboxyl function, is coupled to citrulline in a medium containing water and an acid binding agent or the same reactive form of a protected amino acid or peptide is coupled to an ester of citrulline, e.g. by reacting benzyloxycarbonyl-L-phenylalanine p-nitrophenyl ester with citrulline in a mixture of pyridine and water in the presence of sodium hydroxide benzyloxycarbonyl-L-phenylalanyl-L - citrulline (M.P. 155–157°) is obtained.

Reactions between peptides containing a C-terminal citrulline residue with amino acids or peptides and also reactions between peptides containing an N-terminal citrulline moiety with amino acids or peptides leads to the formation of citrulline peptides with citrulline in the middle of the chain.

The following examples are merely illustrative of the process of this invention and the new peptides formed thereby and are in no way to be considered to be limiting. In the examples all temperatures are given in centigrade.

The following examples illustrate methods for preparing the new citrulline reactants of this invention:

EXAMPLE 1

*Benzyloxycarbonyl-L-citrulline (I)*

A solution of L-citrulline (7.0 g.) in N NaOH (40 ml.) is treated with stirring and cooling in an ice bath with five portions each of benzylchloroformate (8 ml.) and N NaOH (64 ml.). After further stirring for ½ hour at room temperature, the reaction mixture is extracted with ether (200 ml. in five portions) and the aqueous layer acidified with 5 N HCl (10 ml.). The resulting crystalline product is filtered, washed with water, and dried at 40° over $P_2O_5$ in vacuo. The product, Nα-benzyloxycarbonyl-L-citrulline (about 10.3 g.), melts at about 115–117°. Recrystallization from ethanol does not change the melting point.

*Analysis.*—Calcd. for $C_{14}H_{19}O_5N_3$: C, 54.36; H, 6.19; N, 13.59. Found: C, 54.55; H, 6.18; N, 13.63.

EXAMPLE 2

*p-Nitrophenyl Nα-benzyloxycarbonyl-L-citrullinate (II)*

Dicyclohexylcarbodiimide (14.4 g.) is added to a solution of Nα-benzyloxycarbonyl-L-citrulline (I) (21.7 g.) and p-nitrophenol (11.7 g.) with stirring and cooling in an ice bath. After ½ hour at 0° and 4 hours at room temperature, acetic acid (0.7 ml.) is added and after 5 minutes the N,N′-dicyclohexylurea is filtered off and is washed with dimethylformamide (60 ml.). Water (1300 ml.) is added to the combined filtrates and washings at 0°. The crude ester separates as an oil, forming a milky suspension, but soon turns into a crystalline solid. This is collected on a filter, washed with water (700 ml.) and dried in the air. The crude product (about 30 g., M.P. 149–152°) is recrystallized from hot ethanol (500 ml.) to which acetic acid (5 ml.) has been added. The purified ester (about 20 g.) melts at about 163–165°. Further recrystallization does not change its M.P.; $[a]_D^{20}$ −22° (c., 2, dimethylformamide).

*Analysis.*—Calcd. for $C_{20}H_{22}O_7N_4$: C, 55.81; H, 5.15; N, 13.02. Found: C, 55.60; H, 5.61; N, 13.05.

EXAMPLE 3

*Phthalyl-L-citrulline*

L-citrulline is dissolved in dilute sodium carbonate and treated with N-carboethoxyphthalimide. The phthalyl derivative is isolated by acidification and filtration.

EXAMPLE 4

*Benzyloxycarbonyl-L-citrulline chloride*

A suspension of benzyloxycarbonyl-L-citrulline (I) in dry ether is treated with $PCl_5$ at 0°. The acid chloride thus obtained can be used for couplings without further purification.

The following examples illustrate methods for preparing new citrulline containing dipeptides of this invention:

EXAMPLE 5

*Ethyl benzyloxycarbonyl-L-citrullylglycinate (III)*

Ethyl glycinate hydrochloride (11.1 g.) is added to pyridine (160 ml.). It is only partially dissolved. p-Nitrophenyl Nα-benzyloxycarbonyl-L-citrullinate (II) (17.2 g.) is added; and with occasional shaking, the ethyl glycinate hydrochloride slowly dissolves. The reaction is left to proceed at room temperature for 24 hours. The solvent is then removed in vacuo and the residue triturated with water (200 ml.). The crystalline product is collected on a filter and washed with water, ethanol and ethyl acetate (100 ml. each). The dried product weighs about 13.8 g., M.P. about 166.5–168°; $[\alpha]_D^{20}$ −2° (c., 1, dimethylformamide).

*Analysis.*—Calcd. for $C_{18}H_{26}O_6N_4$: C, 54.82; H, 6.65; N, 14.2. Found: C, 54.62; H, 6.82; N, 14.1.

EXAMPLE 6

*Benzyl benzyloxycarbonyl-L-citrullyl-L-prolinate (IV)*

Proline benzyl ester hydrochloride (2.6 g.) and benzyloxycarbonyl-L-citrulline p-nitrophenyl ester (II) (4.3 g.) are dissolved in a mixture of dimethylformamide (25 ml.) and triethylamine (2 ml.). After two and a half days at 37° C. the reaction mixture is diluted with ethyl acetate, extracted once with N hydrochloric acid, several times with N ammonium hydroxide and once with water. After drying over magnesium sulfate the solution is concentrated in vacuo to about 10 ml., cooled, filtered and washed with ethyl acetate. Yield: about 3.85 g.; M.P. about 121–122.5°; $[\alpha]_D^{21}$ −40 (c., 1 dimethylformamide).

*Analysis.*—Calcd. for $C_{26}H_{32}N_4O_6$: C, 62.90; H, 6.47; N, 11.29. Found: C, 63.17; H, 6.39; N, 11.43.

EXAMPLE 7

*p-Nitrophenyl benzyloxycarbonyl-L-citrullyl-L-prolinate (V)*

To a solution of benzyl benzyloxycarbonyl-L-citrullyl-L-prolinate (IV) (2 g.) in methanol (15 ml.), 2 N sodium hydroxide (2 ml.) is added. After one hour at room temperature the mixture is diluted with water, extracted twice with ethyl acetate, acidified and extracted four times with ethyl acetate. This last extract is dried and concentrated to dryness. An oily residue is obtained (1.1 g.) that without further purification is used in the following step.

The crude protected dipeptide acid is dissolved in dimethylformamide (7 ml.) and acetonitrile (3 ml.), p-nitrophenol (0.45 g.) is added and the solution cooled in an ice-water bath. Dicyclohexylcarbodiimide (0.56 g.) is added and the mixture stirred in the bath for half an hour and then at room temperature for 18 hours.

The solvents are evaporated in vacuo and the residue taken up with ethyl acetate, the urea derivative filtered and the solution extracted three times with N sodium bicarbonate and three times with water, dried and concentrated to dryness. The oily residue is extracted several times with hot ether and then dissolved in ethyl acetate and hexane is added to turbidity. After several days at room temperature a crystalline solid is formed; it is filtered and washed with ethyl acetate. Yield: about 300 mg., M.P. about 120–123°. After two recrystallizations from absolute ethanol the M.P. is about 131–132.5°; $[\alpha]_D^{19}$ −63° (c., 1 dimethylformamide).

*Analysis.*—Calcd. for $C_{25}H_{29}N_5O_8$: C, 56.92; H, 5.50; N, 13.28. Found: C, 57.31; H, 5.87; N, 13.02.

EXAMPLE 8

*Benzyloxycarbonyl-L-phenylalanyl-L-citrulline*

To a solution of L-citrulline (1.92 g.) in water (25 ml.) is added a solution of p-nitrophenyl benzyloxycarbonyl-L-phenylalaninate (4.2 g.) in tetrahydrofuran (25 ml.). The mixture is stirred at room temperature and the pH is kept at pH 8.9–9.0. After 13 hours the mixture is acidified, saturated with $NaHCO_3$, extracted seven times with ethyl acetate. On acidification of the aqueous phase an oil separates and readily crystallizes. Recrystallized from ethyl acetate-ethanol, M.P. about 155–157°.

*Analysis.*—Calcd. for $C_{23}H_{28}N_4O_6$: C, 60.50; H, 6.48; N, 12.28. Found: C, 60.54; H, 6.43; N, 11.79.

EXAMPLE 9

*Benzyloxycarbonyl-L-leucyl-L-citrulline*

The method described in Example 8 is applied using benzyloxycarbonyl - L - leucine p-nitrophenyl ester and L-citrulline to give benzyloxycarbonyl - L - leucyl - L-citrulline.

EXAMPLE 10

*Benzyloxycarbonyl-L-citrullyl-L-tryptophane and the free dipeptide*

The method described in Example 8 is used for the preparation of this protected dipeptide. The benzyloxycarbonyl group is removed by catalytic hydrogenation in the presence of Pd on charcoal in a solution of the protected peptide in ethanol. L-citrullyl-L-tryptophane is obtained by evaporation of the solvent.

EXAMPLE 11

*Phthalyl-glycyl-L-citrulline*

Starting from p-nitrophenyl phthalyl-glycinate and L-citrulline, this dipeptide is prepared as described in Example 8 except that $NaHCO_3$ is used instead of NaOH and the pH is kept at 8.2.

EXAMPLE 12

*Phthalyl-L-leucyl-L-citrulline*

The method described in Example 11 is used; the starting materials being p-nitrophenyl phthalyl-L-leucinate and L-citrulline.

EXAMPLE 13

*Benzyloxycarbonyl-L-citrullyl-L-methionine*

This protected dipeptide is prepared as described in Examples 8 and 10, the starting materials being the p-nitrophenyl ester of benzyloxycarbonyl-L-citrulline and L-methionine.

The following examples illustrate methods for preparing new citrulline containing tripeptides of this invention.

EXAMPLE 14

*Ethyl benzyloxycarbonyl-L-prolyl-L-citrullylglycinate (VI)*

To a solution of ethyl Nα-benzyloxycarbonyl-L-citrullylglycinate (III) (7.0 g.) in acetic acid (25 ml.), a solution of HBr in acetic acid (ca. 36%, 25 ml.) is added. After 1 hour at room temperature, ether (ca. 900 ml.) is added. The semi-solid HBr salt which separates is washed with ether by decantation and is dried briefly in vacuo over NaOH. It is then dissolved in dimethylformamide (35 ml.) and triethylamine (7 ml.) is added to the solution, followed by p-nitrophenyl benzyloxycarbonyl-L-prolinate (7.4 g.). On standing at room temperature the reaction mixture turns into a semi-solid mass. After 3 days, it is disintegrated, triturated with ethyl acetate, washed on the filter with ethyl acetate and air dried. It is then triturated with water (200 ml.), washed with water on a filter and dried in vacuo over $P_2O_5$. The product (about 5.71 g.) melts at about 157.5–162° (but completely only at 198–199°).

In a parallel experiment using pyridine (70 ml.) instead of the dimethylformamide, the yield is similar (about 5.82 g.), as is the M.P.; $[\alpha]_D^{20}$ —30° (c., 1, dimethylformamide).

*Analysis.*—Calcd. for $C_{23}H_{33}O_7N_5$: C, 56.20; H, 6.77; N, 14.25; $OC_2H_5$, 9.18. Found: C, 57.02; H, 6.83; N, 14.02; $OC_2H_5$, 10.5.

EXAMPLE 15

*Benzyloxycarbonyl-L-prolyl-L-citrullylglycinamide (VII)*

Ethyl benzyloxycarbonyl-L-prolyl-L-citrullylglycinate (VI) (5.8 g.) is dissolved in methanol (300 ml.) with heating. The solution is cooled in an ice-water bath and is saturated with $NH_3$. The flask is stoppered and kept at room temperature for two days. It is then evaporated to dryness and the residue is recrystallized from hot methanol (300 ml.). The crystals are filtered off and washed with methanol (100 ml.). The evaporation of the mother liquor and washings to approximately 50 ml. produces a second crop. The total amount of amide obtained weighs about 5.1 g., M.P. about 217–221°; $[\alpha]_D^{20}$ —31° (c., 2, dimethylformamide).

*Analysis.*—Calcd. for $C_{21}H_{30}O_6N_6$: C, 54.54; H, 6.54; N, 18.17. Found: C, 54.76; H, 6.69; N, 18.14.

EXAMPLE 16

*Ethyl benzyloxycarbonyl-L-citrullyl-L-tryptophanylglycinate (VIII)*

(A) PREPARATION OF ETHYL BENZYLOXYCARBONYL-L-TRYPTOPHANYLGLYCINATE

Twenty-four grams (0.075 m.) of benzyloxycarbonyl-L-tryptophane is suspended in 150 ml. of chloroform and cooled to —10°. Triethylamine 10.5 ml. is then added with stirring and to the clear solution is added 10.5 g. of isobutyl chloroformate while maintaining the temperature at —10°. The mixture is stirred for 20 minutes during which time the internal temperature is allowed to rise to 0°. The mixture is then cooled to —15° and at this temperature a solution made from 11.55 g. of glycine ethyl ester hydrochloride and 11.55 ml. of triethylamine in 1.50 ml. of chloroform, cooled also to —15°, is added. The reaction mixture is allowed to come to room temperature and then stirred for 2 hours. At the end of this time the mixture is extracted successively once with 100 ml. of water; once with 100 ml. of N hydrochloric acid; once with 100 ml. of water; once with 100 ml. of N $KHCO_3$ and finally once with 100 ml. of water. The solution is then dried over anhydrous $MgSO_4$. The desiccant is filtered off and the solvent evaporated in vacuo. The residue is dissolved in 100 ml. of ethyl acetate and 100 ml. of hexane is added to the mixture. On seeding and standing the mass solidifies. Filtered by suction the product is washed successively with a mixture of 15 ml. of hexane-15 ml. of ethyl acetate, then with a mixture of 24 ml. hexane-6 ml. of ethyl acetate and finally with 60 ml. of hexane. On drying the product weighs about 16 g. and melts at about 119–121°. Additional material can be obtained by working up the mother liquor.

(B) PREPARATION OF ETHYL BENZYLOXYCARBONYL-L-CITRULLYL-L-TRYPTOPHANYLGLYCINATE

A solution of ethyl benzyloxycarbonyl-L-tryptophylglycinate (8.9 g.) in a mixture of methanol (175 ml.) and acetic acid (5.25 ml.) is hydrogenated at normal pressure using palladium 5% on charcoal (900 µg.) as a catalyst.

After one and a half hours the catalyst is filtered and the solvent evaporated in vacuo. The residue is dissolved in pyridine (40 ml.), benzyloxycarbonyl-L-citrullyl-p-nitrophenyl ester (9.03 g.) is added and the solution kept at room temperature for 2 days.

The jelly mass formed is diluted with ethyl acetate (ca. 100 ml.) disintegrated, filtered, washed with ethyl acetate and then with ethanol. About 9.25 g. of product, M.P. about 214–215° (soft 212°) is obtained. A small portion is recrystallized for analysis, M.P. about 216–217°.

*Analysis.*—Calcd. for $C_{29}H_{36}N_6O_7$: C, 59.98; H, 6.25; N, 14.46. Found: C, 59.94; H, 6.24; N, 14.37.

EXAMPLE 17

*Benzyloxycarbonyl-L-phenylalanyl-L-citrullyl-L-tryptophane*

L-citrullyl-L-tryptophane is prepared by removal of the benzyloxycarbonyl group of the protected dipeptide by the procedure of Example 10 and the free dipeptide (sodium salt) is treated with p-nitrophenyl benzyloxycarbonyl-L-phenylalaninate.

EXAMPLE 18

*Benzyloxycarbonyl-L-leucyl-L-citrullylglycine ethyl ester*

To a solution of the protected dipeptide benzyloxycarbonyl-L-leucyl-L-citrulline and of ethyl glycinate in dimethylformamide the calculated amount of dicyclohexyl carbodiimide is added. After 3 hours at room temperature the dicyclohexylurea is filtered off and the product is isolated in the usual manner.

EXAMPLE 19

L-leucyl-L-citrullylglycine

The protected tripeptide ester benzyloxycarbonyl-L-leucyl-L-citrullylglycine (Example 18) is treated with dilute sodium hydroxide to saponify the C-terminal ester group. The resulting product is hydrogenated in the presence of a Pd on charcoal catalyst. The free tripeptide is isolated in the usual way.

EXAMPLE 20

Benzyloxycarbonyl-L-citrullyl-L-leucyl-glycinamide

Benzyloxycarbonyl-L-leucyl glycinamide is hydrogenated in methanol in the presence of acetic acid and a Pd catalyst. The catalyst is removed by filtration, the solvent evaporates in vacuo and the residue is dissolved in pyridine. Benzyloxycarbonyl-L-citrulline p-nitrophenyl ester is added to the solution and the reaction is allowed to proceed for 2 days at room temperature.

EXAMPLE 21

Benzyloxycarbonyl-L-histidyl-L-phenylalanyl-L-citrulline

Benzyloxycarbonyl-L-phenylalanyl-L-citrulline (Example 8) is treated with a solution of HBr in acetic acid. The resulting dipeptide hydrobromide is dissolved in water and is treated with benzyloxycarbonyl-L-histine azide in the presence of excess triethylamine.

The following examples illustrate methods for preparing new citrulline containing tetrapeptides of this invention:

EXAMPLE 22

S-benzyl-N-benzyloxycarbonyl-L-cysteinyl-L-prolyl-L-citrullylglycinamide (IX)

Benzyloxycarbonyl - L - proyly - L - citrullylglycinamide (VII) (1.85 g.) in acetic acid (10 ml.) is treated with a solution of HBr in acetic acid (ca. 36%, 10 ml.). After one hour at room temperature, the hydrobromide is precipitated with ether, washed with ether and dissolved in methanol (50 ml.). Amerlite IRA–400 in acetate cycle is added until the solution gives no reaction with $AgNO_3$. The resin is filtered off and washed with methanol. The methanol is removed from the filtrates in vacuo and the residue is dissolved in pyridine (12 ml.) and dimethylformamide (6 ml.). S-benzyl-N-benzyloxycarbonyl-L-cysteine p-nitrophenyl ester (2.1 g.) is added to the solution. After 24 hours at room temperature, the solvents are removed, in vacuo. The residue is triturated with ethyl acetate, filtered, washed with ethyl acetate and dried. The product (about 1.35 g.) melts at about 181–184°.

In another experiment starting from 3.54 g. of benzyloxycarbonyl-L-prolyl-L-citrullylglycinamide, 3.82 g. of crude S - benzyl - N - benzyloxycarbonyl - L - cysteinyl-L-prolyl-L-citrullylglycinamide is obtained. From this, 2.80 g. is recrystallized from hot methanol (30 ml.); the crystals (about 2.50 g.) melt at about 185–187°; $[\alpha]_D^{20}$ —46° (c., 1, dimethylformamide).

*Anal.*—Calcd. for $C_{31}H_{41}O_7N_7S$: C, 56.78; H, 6.30; N, 14.95; S, 4.89. Found: C, 56.84; H, 6.33; N, 14.83; S, 4.92.

EXAMPLE 23

Ethyl benzyloxycarbonyl-L-phenylalanyl-L-citrullyl-L-tryptophylglycinate (X)

A solution of ethyl benzyloxycarbonyl-L-citrullyl-L-tryptophanylglycinate (VIII) (8.7 g.) in methanol-5% acetic acid (125 ml.) is hydrogenated at normal pressure using palladium 5% on charcoal (1 g.) as catalyst.

After 2 hours the catalyst is filtered, the solvent evaporated in vacuo and the residue dissolved in pyridine (30 ml.). Benzyloxycarbonyl-L-phenylalanine-p-nitrophenyl ester (6.5 g.) is added and the solution kept at room temperature for 2 days.

The jellified mass is diluted with ethyl acetate, disintegrated, filtered and washed with ethyl acetate and ethanol. About 8.0 g. (M.P. about 216–219°) of product is obtained. A small portion is recrystallized for analysis:

*Anal.*—Calcd. for $C_{38}H_{45}N_7O_8$: C, 62.71; H, 6.23; N, 13.47. Found: C, 63.01; H, 6.20; N, 13.49.

EXAMPLE 24

L-histidyl-L-phenylalanyl-L-citrullyl-L-tryptophane $N\alpha$ - benzyloxycarbonyl - L - histidyl-L-phenylalanine is coupled with L-citrullyl-L-tryptophan ethyl ester by the dicyclohexylcarbodiimide method. The protected tetrapeptide ester thus obtained is treated first with dilute sodium hydroxide and then is hydrogenated in the presence of a Pd catalyst.

EXAMPLE 25

Benzyloxycarbonyl-L-citrullyl-L-prolyl-L-leucyl-glycinamide

A solution of L-prolyl-L-leucyl-glycinamide in dimethylformamide is treated with benzyloxycarbonyl-L-citrulline p-nitrophenyl ester. The same protected tetrapeptide ester can be obtained also by the condensation of benzyloxycarbonyl-L-citrulline with L-prolyl-L-leucyl glycinamide in dimethylformamide with the aid of dicyclohexyl carbodiimide.

EXAMPLE 26

L-citrullyl-L-prolyl-L-leucylglycinamide

The benzyloxycarbonyl is removed from the corresponding protected tetrapeptide derivative (Example 25) by hydrogenation in the presence of a palladium on charcoal catalyst.

EXAMPLE 27

L-citrullyl-L-prolyl-L-prolyl-L-serine

L-prolyl-L-prolyl-L-serine is treated with benzyloxycarbonyl-L-citrulline p-nitrophenyl ester and the product thus obtained is hydrogenated in the presence of a palladium on charcoal catalyst.

The following examples illustrate methods for preparing new citrulline containing pentapeptides of this invention:

EXAMPLE 28

Benzyloxycarbonyl-L-asparaginyl-S-benzyl-L-cysteinyl-L-prolyl-L-citrullylglycineamide (XI)

The benzyloxycarbonyl group is removed from S-benzyl - N - benzyloxycarbonyl - L - cysteinyl - L - prolyl - L-citrullylglycinamide (IX) (3.28 g.) with HBr in acetic acid as described in Example 22 and the HBr is removed from the resulting salt with the aid of the amino exchange resin as mentioned there. The residue remaining after evaporation of the methanol in vacuo is dissolved in pyridine (10 ml.) and allowed to react with benzyloxycarbonyl-L-asparagine p-nitrophenyl ester (2.13 g.). The mixture soon turns into a semi-solid mass. After three days at room temperature, the mixture is triturated with ethyl acetate (150 ml.), filtered, washed with ethyl acetate (100 ml.), ethanol (100 ml.), and ethyl acetate (100 ml.), respectively. The dried product weighs about 3.30 g., M.P. about 208–210°; decomposition at 225°; $[\alpha]_D^{20}$ —41° (c., 1, dimethylformamide).

*Anal.*—Calcd. for $C_{35}H_{47}O_9N_9S$: C, 54.61; H, 6.15; N, 16.38; S, 4.17. Found: C, 54.59; H, 6.33; N, 16.18; S, 4.18.

EXAMPLE 29

Ethyl benzyloxycarbonyl-L-histidyl-L-phenylalanyl-L-citrullyl-L-tryptophylglycinate (XII)

A suspension of ethyl benzyloxycarbonyl-L-phenylalanyl-L-citrullyl-L-tryptophylglycinate (6.57 g.) in a mixture of acetic acid (30 ml.), methanol (60 ml.) and water (2 ml.) was hydrogenated at normal pressure using palladium 5% on charcoal (1 g.) as a catalyst.

After two and a half hours the catalyst was filtered, the solvent evaporated in vacuo and the residue dissolved in pyridine. To this solution another of benzyloxycarbonyl-L-histidine azide in 45 ml. of ethyl acetate (prepared from 2.7 g. of benzyloxycarbonyl-L-histidine hydrazide according to R. W. Holley and E. Sondheimer, J. Am. Chem. Soc. 76, 1326 (1954)) was added and the mixture kept in the refrigerator for two days.

The jelly mass was worked out as in the preceding cases and the product recrystallized twice from 90% ethanol. 4.2 g. (M.P. 205–208°) were obtained.

*Anal.*—Calcd. for $C_{44}H_{52}N_{10}O_9$: C, 61.09; H, 6.06; N, 16.19. Found: C, 60.89; H, 6.20; N, 16.28.

EXAMPLE 30

*Benzyloxycarbonyl-L-histidyl-L-phenylalanyl-L-citrullyl-L-tryptophylglycine (XIII)*

The pentapeptide ester obtained in Example 29 (500 mg.) is dissolved in a mixture of methanol (50 ml.) and water (8 ml.) by gentle heating, cooled quickly and normal sodium hydroxide (2.5 ml.) is added. After one and a half hours at room temperature it is diluted with water (12 ml.) and acidified with acetic acid (3.5 ml). An amorphous solid separates. This is filtered and washed with methanol.

Reprecipitation from dimethylformamide-water gives about 350 mg. (M.P. about 288–229°) of product.

*Anal.*—Calcd. for $C_{42}H_{48}N_{10}O_9$: C, 60.27; H, 5.78; N, 16.74. Found: C, 59.93; H, 6.53; N, 16.70.

EXAMPLE 31

*L-histidyl-L-phenylalanyl-L-citrullyl-L-tryptophylglycine (XIV)*

A suspension of the pentapeptide acid (500 mg.) obtained in Example 30 in aqueous 10% acetic acid (35 ml.) is hydrogenated at normal pressure using palladium 5% on charcoal (60 mg.) as a catalyst.

After twenty-four hours the catalyst is filtered and the solvent removed in vacuo. The pink residue is dissolved in water and lyophilized. About 400 mg. of a pink solid is obtained. 100 mg. of this crude material is chromatographed in carboxy methyl cellulose using different concentrations of ammonium acetate as eluent. About 77 mg. of product is recovered that behaves homogenous in paper chromatography.

Unexpectedly, it has been found that L-histidyl-L-phenylalanyl-L-citrullyl-L-tryptophylglycine inhibits the activity of both α-MSH (melanocite stimulating hormone) and ACTH. The latter type of inhibitory activity is considered very desirable and has not been observed heretofore. The compound can be used, therefore, in the treatment of adrenal tumors and adrenal hyperplasia. For this purpose it is administered to avoid surgical removal of the pituitary gland, which is the treatment now practiced. Moreover, L - histidyl - L - phenylalanyl - L - citrullyl-L - tryptophylglycine is useful as an intermediate in the preparation of more complex peptides as shown hereinafter.

EXAMPLE 32

*L-prolyl-L-histidyl-L-phenylalanyl-L-citrullyl-L-tryptophane*

L - histidyl - L - phenylalanyl - L - citrullyl - L - tryptophane (Example 24) is dissolved in a sodium carbonate solution and is treated with benzyloxycarbonyl-L-proline chloride. The resulting protected pentapeptide is hydrogenated in the presence of a palladium catalyst.

EXAMPLE 33

*L-glutamyl-L-histidyl-L-phenylalanyl-L-citrullyl-L-tryptophane*

The tetrapeptide L-histidyl-L-phenylalanyl-L-citrullyl-L-tryptophane (Example 24) is treated with benzyloxycarbonyl-L-glutamic acid α-p-nitrophenyl ester γ-methyl ester. The product is treated with dilute alkali and then hydrogenated to give the free pentapeptide.

EXAMPLE 34

*L-methionyl-L-glutamyl-L-histidyl-L-phenylalanyl-L-citrulline*

Benzyloxycarbonyl-L-methionyl-L-glutamic acid γ-methyl ester and L-histidyl-L-phenylalanyl-L-citrulline methyl ester are treated with carbonyldiimidazole. The resulting protected pentapeptide ester is saponified with dilute alkali and hydrogenated to give the free pentapeptide.

The following examples illustrate methods for preparing new citrulline containing hexapeptides of this invention.

EXAMPLE 35

*Benzyloxycarbonyl - L - glutaminyl - L - asparaginyl - S - benzyl - L - cysteinyl - L - prolyl - L - citrullylglycinamide (XV)*

The benzyloxycarbonyl group is removed from benzyloxycarbonyl - L - asparaginyl - S - benzyl - L - cysteinyl-L - prolyl - L - citrullylgylcinamide (XI) (2.7 g.) as described in Example 22. After removal of the HBr with the aid of an anion exchange resin, followed by evaporation of the methanol, the residue is dissolved in pyridine (10.5 ml.) and p-nitrophenyl benzyloxycarbonyl-L-glutaminate (1.61 g.) is added to the mixture. The solution becomes a semi-solid mass in approximately one hour. The next day, ethyl acetate (120 ml.) is used to disintegrate the solid. The product is filtered and washed with ethyl acetate (80 ml.), ethanol (80 ml.) and ethyl acetate again (80 ml.). The dried protected haxapeptide weighs about 2.72 g., M.P. about 186–202° (dec.); $[\alpha]_D^{20}$ —42° (c, 1, dimethylformamide).

*Anal.*—Calcd. for $C_{40}H_{55}O_{11}N_{11}$ S: C, 53.50; H, 6.17; N, 17.16; S, 3.58. Found: C, 53.48; H, 6.16; N, 17.04; S, 3.79.

EXAMPLE 36

*L-glutamyl-L-histidyl-L-phenylalanyl-L-citrullyl-L-tryptophylglycine*

Benzyloxycarbonyl-L-glutamic acid α-p-nitrophenyl ester-γ-methyl ester is allowed to react with the pentapeptide L - histidyl - L - phenylalanyl - L - citrullyl - L-tryptophylglycine (Example 31). The product of the reaction is treated with dilute alkali to saponify the methyl ester group on the glutamine acid moiety and then the benzyloxycarbonyl group is removed by hydrogenolysis.

EXAMPLE 37

*L-methionyl-L-glutamyl-L-histidyl-L-phenylalanyl-L-citrullyl-L-tryptophane*

The free pentapeptide described in Example 33 is treated with p-nitrophenylbenzyloxycarbonyl-L-methioninate. The protected hexapeptide thus formed is hydrogenated in the presence of a Pd catalyst.

The following examples illustrate methods for preparing the new citrulline containing heptapeptides of this invention:

EXAMPLE 38

*Benzyloxycarbonyl - L - phenylalanyl - L - glutaminyl - L - asparaginyl - S - benzyl - L - cysteinyl - L - prolyl - L - citrullylglycinamide (XVII)*

Starting with benzyloxycarbonyl - L - glutaminyl - L - asparaginyl - S - benzyl - L - cysteinyl - L - prolyl - L - citrullylglycinamide (XV) (2.25 g.), the procedure for the removal of the benzyloxycarbonyl group and of HBr is repeated as described in Example 22. The free amino component (as acetate) is reacted with p-nitrophenyl benzyloxycarbonyl-L-phenylalaninate (1.26 g.) and, after one day at room temperature, the product is isolated by the procedure described in Example 35. The crude product (about 2.23 g.), M.P. about 184–204°; $[\alpha]_D^{20}$ —47.7° (c, 1, dimethylformamide), analyzed as follows:

*Anal.*—Calcd. for $C_{49}H_{64}O_{12}N_{12}S$: C, 56.31; H. 6.17; N, 16.08; S, 3.07. Found: C, 53.54; H, 6.08; N, 16.65; S, 3.44.

In a second experiment the HBr salt of the hexapeptide amide (from 180 mg. of XV) is dissolved in dimethylformamide and allowed to react with the active ester of protected phenylalanine (105 mg.). The product (about 181 mg.), M. P. about 186–202°, dec. at 208°, is less impure than the one described above. A sample (100 mg.) reprecipitates from acetic acid-ethanol to yield about 62 mg. of a product, M.P. about 208–212° (dec.).

*Anal.*—Found: C, 56.83; H, 6.68; N, 16.33; S, 3.14.

The crude benzyloxycarbonyl-L-phenylalanyl-L-glutaminyl - L - asparaginyl - S - benzyl - L - cysteinyl - L-prolyl-L-citrullylglycinamide (XVI) (1.35 g.) is partially purified by extraction with hot methanol (100 ml. in several portions). An insoluble residue, (A) (0.48 g., M.P. 210–214°), a solid which separated from the methanol upon cooling and standing, (B) (0.33 g., M.P. ca. 210°), and a methanol soluble part, (C) (0.48 g., M.P. 165–173°) are obtained, $[\alpha]_D^{20}$ 38°, 38° and 52° respectively. Fraction B is further purified by countercurrent distribution in a system of n-butanol-acetic acid-water (4:1:5). A train of seven Erlermeyer flasks is used with 25–25 ml. phases in each. The lower phase is transferred and distribution is performed with complete withdrawal of both phases. The fractions are examined by paper chromatography in the same solvent system as used for distribution. The spots are revealed by a modification of the procedure of Rydon treatment with hyprochlorite, followed by spraying with a KI-starch solution, (Rydom et al., Nature 169, 922 (1952); Pan et al., Anal. Chem. 28, 836 (1956)). Fractions 0, 1, 2 and 3 (upper phase only) contain the component fastest on chromatograms. This is isolated by evaporation of the solvent, in vacuo. The residue is dissolved in acetic acid (2.5 ml.) and ethanol (20 ml. in portions) is added to the solution. The next day the precipitate is filtered, washed with ethanol and dried. The protected heptapeptide amide (about 146 mg.), thus purified, melts at about 205–208° (dec.) $[\alpha]_D^{20}$ —32° (c., 1, dimethylformamide).

*Anal.*—Found: C, 55.83; H, 6.52; N, 15.80; S, 3.02.

EXAMPLE 39

*Benzyloxycarbonyl - L - isoleucyl - L - glutaminyl - L- asparaginyl - S - benzyl - L - cysteinyl - L - propyl - L- citrullylglycinamide (XVII)*

The benzyloxycarbonyl group is removed from the protected hexapeptide (XV) (0.72 g.) with HBr in AcOH. The hydrobromide of the resulting free amine is dissolved in dimethylformamide (7 ml.); triethylamine (0.48 ml.) and p-nitrophenylbenzyloxycarbonyl-L-isoleucinate (0.39 g.) are added. Two days later acetic acid (0.3 ml.) and ethyl acetate (50 ml.) are added to the mixture. The product is filtered and washed well with ethyl acetate, ethanol and again wtih ethyl acetate. The protected heptapeptide amide (0.70 g.) sinters at 206°, M.P. about 216–218°, dec. at 224°. A portion (100 mg.) is purified by dissolving it in acetic acid (5 ml.) and slow addition of ethanol (50 ml.). The precipitate is washed with ethanol. After drying, it weighs about 74 mg., M.P. about 229–323°, dec. at 235°; $[\alpha]_D^{20}$ —32° (c., 1, dimethylformamide).

*Anal.*—Calcd. for $C_{46}H_{66}O_{12}N_{12}S$: C, 54.64; H, 6.58; N, 16.62; S, 3.17. Found: C, 53.06; H, 6.77; N, 16.54; S, 3.18.

EXAMPLE 40

*L - seryl - L - methionyl - L - glutamyl - L - histidyl - L phenylalanyl-L-citrullyl-L-triptophyl*

The free heptapeptide-L-methionyl-L-glutamyl-L-histidyl-L-phenylalanyl-L-citrullyl-L-tryptophane (Example 37) is treated with N-benzyloxycarbonyl-o-benzyl-L-serine p-nitrophenyl esters. The protected heptapeptide thus formed is hydrogenated to remove both the benzyloxycarbonyl and the benzyl groups from the serine residue.

The following examples illustrate methods for preparing new citrulline containing octapeptides of this invention:

EXAMPLE 41

*O - benzyl - N - benzyloxycarbonyl - L - tyrosyl - L- phenyllalanyl - L - glutaminyl - L - asparaginyl - C - benzyl - L - cysteinyl - L - prolyl - L - citrullylglycinamide (XVIII)*

Benzyloxycarbonyl - L - phenylalanyl - L - glutaminyl- L - asparaginyl - S - benzyl - L - crysteinyl - L - prolyl-L-citrullylglycinamide (XV) (105 mg.) in acetic acid (0.3 ml.) is treated with HBr in AcOH (36%, 0.3 ml.). After one hour at room temperature, ether (12 ml.) is added and the precipitate is washed with ether. The hydrobromide is dissolved in dimethylformamide (0.5 ml.) and triethylamine (0.25 ml.) is added, followed by p-nitrophenyl O-benzyl-N-benzyloxycarbonyl-L-tyrosinate (63 mg.). All these operations are performed in a centrifuge tube. After three days at room temperature, acetic acid (0.05 ml.) and ethyl acetate (10 ml.) are added to the semi-solid mass. The precipitate is washed with ethyl acetate (5 ml.), ethanol (5 ml.), and ethyl acetate (5 ml.). After drying, the crude protected octapeptide weighs about 116 mg., M.P. about 189–221° (dec.). Part of this product (80 mg.) is dissolved in acetic acid (3 ml.) and ethan 91 is added in portions (a total of 21 ml.). The next day the precipitate is filtered and washed with ethanol 6 ml.) and ethyl acetate (6 ml.). The recovered product weighs about 56 mg., M.P. about 242–245° (dec.) (sintering at 220°); $[\alpha]_D^{20}$ —36° (c., 2, dimethylformamide).

*Anal.*—Calcd. for $C_{65}H_{79}O_{14}N_{13}S$: C, 60.12; H, 6.13; N, 14.02; S, 2.47. Found: C, 59.95; H, 6.01; N, 14.41; S, 2.57.

EXAMPLE 42

*O - benzyl - N - benzyloxycarbonyl - L - tyrosyl - L- isoleucyl - L - glutaminyl - L - asparaginyl - S - benzyl- L - cysteinyl - L - propyl - L - citrullylglycinamide (XIX)*

Benzyloxycarbonyl - L - isoleucyl - L - glutaminyl - L-asparaginyl - S - benzyl - L - cysteinyl - L - propyl - L-citrullylglycinamide (XVII) (606 mg.) is converted into the octapeptide derivative in the manner described in Example 39 using p-nitrophenyl O-benzyl-N-benzyloxycarbonyl-L-tyrosinate (394 mg.) as the acylating agent. The product weighs 623 mg., M.P. 235–239° (dec.). A portion (125 mg.) was purified by reprecipitation from acetic acid with ethanol; the recovered material (101 mg.), M.P. 232–243°, dec. at 244°, was still impure, as indicated by analysis, however, no solvent system was found for its purification.

*Anal.*—Calcd. for $C_{62}H_{81}O_{14}N_{13}S$: C, 58.89; H, 6.46; N, 14.40; S, 2.54. Found: C, 57.08; H, 6.44; N, 14.59; S, 2.58.

EXAMPLE 43

*L-seryl-L-methionyl-L-glutamyl-L-histidyl-L-phenylalanyl-L-citrullyl-L-tryptophylglycine*

The free heptapeptide L-methionyl-L-glutamyl-L-histidyl - L - phenylalanyl - L - citrullyl - L - tryptophylglycine is treated wtih the p-nitrophenyl ester of N-benzyloxycarbonyl-O-benzyl-L-serine. The protected octapeptide is then hydrogenated to give the free octapeptide.

The following examples illustrate methods for preparing new citrulline containing nonapeptides of this invention:

EXAMPLE 44

S - benzyl - N - benzyloxycarbonyl - L - cysteinyl - L - tyrosyl - L - phenylalanyl - L - glutaminyl - L - asparaginyl - S - benzyl - L - cysteinyl - L - prolyl - L - citrullylglycinamide (XX)

The benzyloxycarbonyl and O-benzyl groups are removed from O-benzyl-N-benzyloxycarbonyl-L-tyrosyl-L-phenylalanyl - L - glutaminyl - L - asparaginyl - S - benzyl-L-cysteinyl-L-prolyl-L-citrullylglycinamide (XVIV) (1.7 g.) by the procedure of Example 22. After the removal of HBr with resin and evaporation of the solvent, the residue is allowed to react with S-benzyl-N-benzyloxycarbonyl-L-cysteine p-nitrophenyl ester (0.75 g.). Ethyl acetate (100 ml.) is added the next day and the precipitate is washed with 50 ml. portions each of ethyl acetate, ethanol and ethyl acetate. The dried product, about 1.46 g., about M.P. 175–198° (dec.), $[\alpha]_D^{20}$ —51° (c., 1, dimethylformamide), is impure. The crude peptide (1.4 g.) is extracted wth hot methanol (100 ml.). A fraction (about 0.30 g.), M.P. about 215–220° (dec.), remains undissolved; a second (about 0.58 g.), M.P. about 210–218° (dec.), separates from the methanol on standing in the cold and a third (about 0.44 g.), M.P. about 100–110° (dec.), is obtained upon evaporation of the solvent. The first two fractions are combined and further purified by counter-current distribution as described for Compound XVI (see Example 38). In this purification, the protected peptide (XX) (750 mg.) is dissolved in 50–50 ml. of the two phases of the solvent system. A train of eight flasks are used, with complete withdrawal of both phases. Paper chromatography reveals that the protected nonapeptide—the fastest moving component—is present, without the contaminants, in flask O (only upper phase). Evaporation of the solvent leaves a residue (203 mg.), which is dissolved in acetic acid (4 ml.) and precipitated by the slow addition of ethanol (75 ml.). The purified protected nonapeptide (XX) is filtered on the next day, washed wth ethanol and dried. About 140 mg. of a product, M.P. about 201–210°, $[\alpha]_D^{21}$ —42° (c., 1, dimethylformamide), is obtained.

Anal.—Calcd. for $C_{68}H_{84}O_{15}N_{14}S_2$: C, 58.27; H, 6.04; N, 13.99; S, 4.57. Found: C, 58.39; H, 6.23; N, 13.96; S, 4.65.

EXAMPLE 45

The nonapeptide XX is also prepared by coupling S-benzyl - N - benzyloxycarbonyl - L - cysteinyl - L-tyrosyl-L-phenylalanyl-L-glutaminyl-L-asparagine to the free tetrapeptide from S-benzyl-N-benzyloxycarbonyl-L-cysteinyl-L-prolyl-L-citrullylglycinamide (IX). Compound IX (1.0 g.) is treated with HBr in AcOH and the HBr is removed from the hydrobromide with Amerlite IRA-400 (OH cycle). Removal of the solvent leaves a foam (0.80 g.) which is dissolved in dimethylformamide (5 ml.). The protected pentapeptide (0.90 g.) and dicyclohexylcarbodiimide[13] (0.68 g.) are added to the solution and the mixture is left at room temperature for three days. Acetic acid (0.5 ml.) is added. The urea derivative is removed by filtration and washed with dimethylformamide (5 ml.). The filtrate is diluted with ethyl acetate (100 ml.). The precipitate thus formed is filtered and washed with ethyl acetate (50 ml.). The crude product (1.25 g.) is extracted with methanol (50 ml.), then with warm methanol (30 ml.). The residue (0.51 g.), M.P. 215–220°, is still not pure. A portion (200 mg.) is reprecipitated from acetic acid with ethanol. The recovered product (about 149 mg.) has an M.P. about 210–220°; $[\alpha]_D^{20}$ —40° (c., 1, dimethylformamide).

Anal.—Found: C, 58.69; H, 5.89; N, 12.5; S, 4.62.

EXAMPLE 46

8-L-citrulline vasopressin (XXI)

The protective groups are removed from S-benzyl-N-benzyloxycarbonyl - L - cysteinyl - L - tyrosyl - L - phenylalanyl - L - glutaminyl - L - aspariginyl - S - benzyl - L-cysteinyl-L-prolyl-L-citrullylglycinamide (XX) (50 mg.) by treatment with Na in liquid ammonia (50 ml.) until a permanent blue color is obtained. Ammonium chloride is added to discharge the color. The $NH_3$ is allowed to evaporate. The residue is dissolved in water (100 ml.) and aerated at pH 6.5 for 2 hours. This solution is tested for biological activity. The uterus contracting, antidiuretic and pressor activity are all found to be approximately 30 units for 1 mg. of the free peptide.

These tests show that 8-L-citrulline vasopressin possesses the same qualitative activity as does vasopressin and hence may be used in lieu of the latter in the treatment of diabetes insipidus for which purpose it is administered parenterally in the form of its salts, e.g., tannate.

EXAMPLE 47

S - benzyl - N - benzyloxycarbonyl - L - cysteinyl - L - tyrosyl - L - isoleucyl - L - glutaminyl - L - asparaginyl - S - benzyl - L - cysteinyl - L - prolyl - L - citrullylglycinamide (XXII)

The octapeptide derivative O-benzyl-N-benzyloxycarbonyl - L - tyrosyl - L - isoleucyl - L - glutaminyl - L-asparaginyl - S - benzyl - L - cysteinyl - L - propyl - L-citrullylglycinamide (XVIII) (505 mg.) is treated with HBr in acetic acid. The resulting hydrobromide is dissolved in dimethylformamide (3 ml.). Triethylamine (0.35 ml.) and S-benzyl-N-benzyloxycarbonyl-L-cysteine p-nitrophenyl ester (233 mg.) are added. Three days later, the product is isolated from the reaction mixture as described in Example 39. The crude protected nonapeptide (about 460 mg.), M.P. about 236–240° (dec.) is purified by reprecipitation from acetic acid with ethanol. The recovered material (about 390 mg.) has an M.P. about 245–248°.

Anal.—Calcd. for $C_{65}H_{86}O_{15}N_{14}S_2$: C, 57.09; H, 6.34; N, 14.34; S, 4.69. Found: C, 56.49; H, 6.43; N, 14.24; S, 4.36.

EXAMPLE 48

8-L-citrulline oxytocin (XXIII)

The protecting groups are removed from S-benzyl-N-benzyloxycarbonyl - L - cysteinyl - L - tyrosyl - L - isoleucyl - L - glutaminyl - L - asparaginyl - S - benzyl - L-cysteinyl - L - prolyl - L - citrullylglycinamide (XXII) as described in the preparation of 8-L-citrulline vasopressin (XXI).

8-L-citrulline oxytocin is a biologically active material which possesses the same qualitive activities as does oxytocin. Hence, 8-L-citrulline oxytocin can be used in lieu of oxytocin to induce labor for which purpose it is administered in aqueous solution, e.g., by i.v., infurian.

EXAMPLE 49

Methyl benzyloxycarbonyl - L - citrullyl - L - prolyl - L-prolyl - glycyl - L - phenylalanyl - O - acetyl - L - seryl - L - prolyl - L - phenylalanyl - nitro - L - argininate (XXIV)

(A) PREPARATION OF BENZYLOXYCARBONYL-L-PHENYLALANYL-NITRO-L-ARGININE

To a solution of nitroarginine (9.68 g.) in a mixture of N sodium hydroxide (45 ml.) and water (80 ml.) a solution of benzyloxycarbonyl-L-phenylalanine p-nitrophenyl ester (16.8 g.) in pyridine (90 ml.) is added. A solid precipitate is formed and the suspension is stirred at room temperature. When the pH drops to 9–9.3 it is kept at this level by addition of 2 N sodium hydroxide. After 5 to 6 hours and a total consumption of 18.35 ml. of 2 N sodium hydroxide, the pH remains constant and the clear reaction mixture gives no turbidity upon dilution with water. The solution is acidified with concentrated hydrochloric acid to pH 8 and saturated with solid sodium bicarbonate, extracted seven times with ethyl acetate to remove p-nitrophenol and pyridine and acidified to congo red with concentrated hydrochloric acid. An oil separates and readily crystallizes. The product is filtered, washed with water and dried; about 16.7 g., M.P. about 170–173° (sintering 168°). On extraction with ether a product weighing about 15.7 g., M.P. about 173–176° is obtained; $[\alpha]_D^{20}$ +2.1 (c., 2 pyridine).

(B) PREPARATION OF METHYL BENZYLOXYCARBONYL-L-PHENYLALANYL-NITRO-L-ARGININATE

To a solution of benzyloxycarbonyl-L-phenylalanyl-nitro-L-arginine (7.7 g.) in methanol (80 ml.) a solution of diazomethane in ether is added until the yellow color persists. The solution is kept at room temperature (20–30 minutes), then a few drops of acetic acid is added to destroy the excess of diazomethane and the solution is evaporated to dryness. The residue is crystallized from methanol, about 6.6 g. of product, M.P. about 148–151° (soft 145°) is obtained. Another recrystallization from methanol gives about 6 g. of product, M.P. about 150–152°; $[\alpha]_D^{20}$ —13.5 (c., 1 MeOH).

(C) PREPARATION OF METHYL BENZYLOXYCARBONYL-L-PROLYL-L-PHENYLALANYL-NITRO - L - ARGININATE

A solution of hydrobromic acid (36%, 50 ml.) is added to a solution of methyl benzyloxycarbonyl-L-phenylalanyl-nitro-L-argininate (6.7 g.) in acetic acid (50 ml.). After one hour at room temperature ether is added until no more precipitate is formed. The hydrobromide is washed several times with ether by decantation and then dried for an hour in vacuo over sodium hydroxide.

The dipeptide ester hydrobromide is dissolved in dimethylformamide (65 ml.), triethylamine (3.75 ml.) and benzyloxycarbonyl-L-proline p-nitrophenyl ester (4.8 g.) are added and the mixture is kept at room temperature for two days. The mixture is then heated in the steam bath for 15 minutes, cooled, diluted with ethyl acetate and washed with N hydrochloric acid, then several times with N ammonium hydroxide and finally with water. The solution is dried over magnesium sulfate and evaporated to dryness. The residue is crystallized from methanol-water. The protected tripeptide ester (about 4.8 g.) melts at about 137–139° (soft 135°); $[\alpha]_D^{20}$ —38° (c., 1.1 DMF).

Anal.—Calcd. for $C_{29}H_{32}N_2O_8$: C, 57.00; H, 6.05; N, 16.00. Found: C, 57.65; H, 6.23; N, 16.18.

(D) PREPARATION OF p-NITROPHENYL O-BENZYL-N-CARBOBENZOYLOXY-L-SERINATE

O-benzyl-N-carbobenzyloxy-L-serine (6.6 g.) [prepared from 2,3-dibromo ethyl propionate and resolved via its N-acetyl derivative with acylase] is esterified with p-nitrophenol (3.0 g.) in 75 ml. of ethyl acetate containing dicyclohexyldiimide (4.2 g.). The mixture is stirred first for one-half hour at 0° and then for one and a half hours at room temperature. One-half milliliter of glacial acetic acid is then added to the mixture and the insoluble material filtered off and washed with ethyl acetate. The filtrate and washings are combined and the solvent evaporated under vacuum at room temperature. The residue is dissolved in a small amount of ethyl acetate to remove additional small amounts of the urea and the solvent again evaporated as above. The final residue is an oil and weighs about 9 g. This is extracted with 18 liters of hot hexane from which the ester separates slowly first as an oil which on further standing at —5° turns to fine crystals. Filtered off and dried the product weighs about 6 g. and melts at about 45–47°; $[\alpha]_D^{22}$ —12.2 (c., 2% dimethylformamide containing 1% acetic acid).

Anal.—Calcd. for $C_{24}H_{22}N_2O_7$: C, 63.99; H, 4.92; N, 6.22. Found: C, 64.27; H, 5.15; N, 6.37.

(E) PREPARATION OF METHYL O-BENZYL-N-BENZYLOXYCARBONYL - L - SERYL - L - PROLYL-L-PHENYLALANYL-NITRO-L-ARGININATE

The benzyloxycarbonyl group is removed from methyl benzyloxycarbonyl-L-prolyl - L - phenylalanyl - nitro - L-argininate (3.05 g.) as described in step C. The hydrobromide of the tripeptide ester is dissolved in methanol, the solvent removed in vacuo and the residue again dissolved in methanol (20 ml.). To this solution Amberlite IRA–400 (acetate cycle) is added with stirring until the bromide reaction is negative. The solution is filtered through a layer of resin and concentrated to dryness. The residue is dissolved in dimethylformamide (12.5 ml.) and p-nitrophenyl O-benzyl-N-carbobenzyloxy-L-serinate (2.25 g.) is added. Afte rtwo and a half days at room temperature the product is isolated by the procedure in step C. The crude protected tetrapeptide ester is dissolved in ethyl acetatemethanol and precipitated with ether, yielding about 2.6 g. of product, M.P. about 100–102°; $[\alpha]_D^{20}$ —40° (c., 1.0 dimethylformamide).

Anal.—Calcd. for $C_{39}H_{48}N_8O_{10}$: C, 59.50; H, 6.10; N, 14.20. Found: C, 59.10; H, 6.20; N, 14.20.

(F) PREPARATION OF METHYL BENZYLOXYCARBONYL-L-PHENYLALANYL-O-ACETYL-L-SERYL-L-PROLYL-L-PHENYLALANYL-NITRO-L-ARGININATE

The benzyloxycarbonyl group is removed from methyl O-benzyl - N - benzyloxy - carbonyl-L-seryl-L-prolyl-L-phenylalanyl-nitro-L-argininate (1.94) with hydrobromic acid in acetic acid, and the hydrobromic acid is removed as described in step E. The heptapeptide ester acetate is dissolved in a 1:1 mixture of pyridine and dimethylformamide (7.5 ml.) and benzyloxycarbonyl-L-phenylalanine p-nitrophenyl ester is added.

After two and a half days at 37° the mixture is diluted with ethyl acetate, washed once with N hydrochloric acid and once with water. The solution is dried over magnesium sulfate and concentrated to about 5 ml.; the product begins the crystallize. The crystals are filtered, washed with ethyl acetate and dried. About 910 ml. of a product, M.P. about 208–211° is obtained. Recrystallization from methanol does not change the melting point; $[\alpha]_D^{20}$ —54° (c., 1.0 dimethylformamide).

Anal.—Calcd. for $C_{43}H_{53}N_9O_{12}$: C, 58.18; H, 5.98; N, 14.20. Found: C, 58.29; H, 6.21; N, 14.38.

(G) PREPARATION OF BENZYLOXYCARBONYL-L-PROLYLGLYCINE

To a solution of glycine (1.7 g.) in water (50 ml.) benzyloxycarbonyl-L-proline p-nitrophenyl ester (7.4 g.) in pyridine (55 ml.) is added. The suspension is stirred and the pH kept at 8.3–8.5 by the addition of N sodium hydroxide. After about six hours and a total consumption of 37.2 ml. of N sodium hydroxide the pH remains constant and a clear solution is obtained. After dilution with water (50 ml.) it is neutralized and saturated with solid sodium bicarbonate. The mixture is extracted several times with ethyl acetate and then acidified to Congo red with concentrated hydrochloric acid. An oil separates and turns readily into a crystalline solid. This is filtered and washed with water. The dry product weighs about 5.02 g., M.P. about 124–125°.

(H) PREPARATION OF p-NITROPHENYL BENZYLOXYCARBONYL-L-PROLYLGLYCINATE

To a solution of benzyloxycarbonyl-L-prolylglycine (918 mg.) in ethyl acetate (16 ml.), dimethylformamide (1.5 ml.) and p-nitrophenol (0.5 g.) are added and the solution cooled in an ice-water bath. Dicyclohexylcarbodiimide (0.62 g.) is added through a funnel, the latter having been rinsed with ethyl acetate (3 ml.). The mixture is stirred for half an hour in an ice-water bath and then for two hours at room temperature. The urea derivative is filtered off and the solution evaporated to dryness. The oily residue when treated with boiling ether readily crystallizes giving about 1.1 g. of product, M.P. about 140–142°.

After recrystallization from ethanol containing 1% acetic acid the melting point is about 143.5–145°; $[\alpha]_D^{22}$ —63° (c., 1 dimethylformamide).

Anal.—Calcd. for $C_{21}H_{21}N_3O_7$: C, 59.01; H, 4.92; N, 9.84. Found: C, 59.35; H, 5.12; N, 9.83.

(I) PREPARATION OF METHYL BENZYLOXYCARBONYL-PROLYL-GLYCYL-L-PHENYLALANYL - O - ACETYL-L - SERYL - L - PROLYL-L-PHENYLALANYL-NITRO-L-ARGININATE

The benzyloxycarbonyl group is removed from methyl benzyloxycarbonyl - L - phenylalanyl - O - acetyl-L-seryl-L-prolyl-L-phenylalanyl-nitro-L-argininate (9.60 g.) and the resulting hydrobromide dissolved in dimethylformamide (5 ml.). Triethylamine (0.45 ml.) and benzyloxycarbonyl-L-prolylglycine p-nitrophenyl ester (0.33 g.) are added and the mixture is kept at room temperature. After two and a half days it is diluted with ethyl acetate, the solution washed with N hydrochloric acid, with N ammonium hydroxide, with water and finally dried over magnesium sulfate. On concentration in vacuo the product begins to crystallize. When the volume is about 3 ml. the suspension is cooled, the heptapeptide derivative, filtered and washed with ethyl acetate, weighs about 0.61 g., M.P. about 188–190° (sintering 185°). It can be recrystallized from 95% ethanol (M.P. about 193–196°); $[\alpha]_D^{20}$ —59° (c., 1.3 dimethylformamide).

Anal.—Calcd. for $C_{50}H_{63}N_{11}O_{14}$: C, 57.63; H, 6.05; N, 14.79. Found: C, 57.54; H, 6.13; N, 14.73.

(J) PREPARATION OF METHYL BENZYLOXYCARBONYL-L-CITRULLYL-L-PROLYL - GLYCYL - L - PHENYLALANYL-O-ACETYL-L-SERYL-L-PROLYL - L - PHENYLALANYL-NITRO-L-ARGININATE (XXIV)

The benzyloxycarbonyl group of methyl benzyloxycarbonyl - L - prolyl - glycyl - L - phenylalanyl - O - acetyl-L - seryl - L - prolyl - L - phenylalanyl - nitro - L - argininate (100 mg.) is removed as described in Step C. The hydrobromide is dissolved in dimethylformamide (2.5 ml.), and triethylamine (0.3 ml.) and p-nitrophenyl benzyloxycarbonyl-L-citrullyl-L-prolinate (V) (70 mg.) are added.

After two and a half days at 37° the mixture is diluted with ethyl acetate (30 ml.) and 95% ethanol (1 ml.), washed once with N hydrochloric acid and once with water, dried and concentrated in vacuo to about 1 ml. Ethyl acetate is added (2 ml.) and the solid precipitates, is filtered and washed with ethyl acetate. The protected nonapeptide ester (about 35 mg.) melts at about 145–155° (soft. 130°); $[\alpha]_D^{20}$ —58° (c., 1 dimethylformamide).

Anal.—Calcd. for $C_{61}H_{81}N_{15}O_{17}$: C, 56.50; H, 6.30; N, 16.21. Found: C, 56.89; H, 6.40; N, 16.24.

EXAMPLE 50

Alternate procedure (A) PREPARATION OF METHYL BENZYLOXYCARBONYL-L-PROLYL-L-PROLYL - GLYCYL-L-PHENYLALANYL-O-ACETYL-L-SERYL-L-PROLYL - L - PHENYLALANYL-NITRO-L-ARGININATE The benzyloxycarbonyl group of methyl benzyloxycarbonyl - L - prolyl - glycyl - L - phenylalanyl - O - acetyl-L - seryl - L - prolyl - L - phenylalanyl - nitro - L - argininate (200 mg.) is removed as described in Step C of Example 49. The hydrobromide is dissolved in dimethylformamide (2.5 ml.) and triethylamine (0.6 ml.) and benzyloxycarbonyl-L-proline p-nitrophenyl ester (85 mg.) are added. After two and a half days at 37° C. the mixture is diluted with ethyl acetate (70 ml.) and 95% ethanol (1 ml.), washed with N hydrochloric acid, several times with N ammonium hydroxide and finally with water. After drying over magnesium sulfate the solvent is concentrated in vacuo to about 1 ml., ethyl acetate (3 ml.) is added and the solid precipitates and is filtered and washed with ethyl acetate. The protected octapeptide ester (about 142 mg.) melts at 131–135° C.; $[\alpha]_D^{20}$ —60° (c., 1.0 dimethylformamide).

Anal.—Calcd. for $C_{55}H_{70}N_{12}O_5$: C, 57.99; H, 6.15; N, 14.76. Found: C, 58.51; H, 6.51; N, 14.38.

(B) PREPARATION OF METHYL BENZYLOXYCARBONYL-L-CITRULLYL-L-PROLYL - L - PROLYL-GLYCYL-L-PHENYLALANYL-O-ACETYL-L-SERYL - L - PROLYL-L-PHENYLALANYL-NITRO-L-ARGININATE (XXIV)

The benzyloxycarbonyl group of methyl benzyloxycarbonyl - L - prolyl - glycyl - L - phenylalanyl - O - acetyl-L - seryl - L - prolyl - L - phenylalanyl - nitro - L - argininate (100 mg.) is removed as described in Step C of Example 49. The remaining hydrobromide is dissolved in dimethylformamide (1.25 ml.) and triethylamine (0.3 ml.) and benzyloxycarbonyl-L-citrulline p-nitrophenyl ester (II) (55 mg.) is added.

After two and a half days at 37° the reaction mixture is diluted with ethyl acetate (40 ml.) and 95% ethanol (1 ml.), washed with N hydrochloric acid, several times with N ammonium hydroxide and finally with water. After drying the solvent is evaporated in vacuo to dryness and the solid residue is washed with ethyl acetate. The protected nonapeptide ester melts at about 140–150° (soft. 125°).

EXAMPLE 51

*L-citrullyl-L-prolyl-L-prolyl-gycyl-L-phenylalanyl-L-seryl-L-prolyl-L-phenylalanyl-L-arginine (XXV)*

To a solution of 10 mg. of methyl benzyloxycarbonyl-L - citrullyl - L - prolyl - L - prolyl - gycyl - L - phenylalanyl - O - acetyl - L - seryl - L - prolyl - L - phenylalanyl-nitro-L-arginate (XXIV) in 1 ml. of methanol, 0.05 ml. of N sodium hydroxide is added. After six hours at room temperature the solution is neutralized, the solvent removed in vacuo, the residue dissolved in a mixture of acetic acid and water and catalytically hydrogenated.

The free nonapeptide obtained showed activity in the rat uterus test in concentrations of 0.1 γ/ml. Thus, L-citrullyl - L - prolyl - L - prolyl - glycyl - L - phenlalanyl-L-seryl-L-prolyl-L-phenylalanyl-L-arginine is a biologically active material which possesses the same qualitative activities as does bradykinin.

The following examples illustrate methods for preparing new citrulline containing polypeptides of this invention which contain more than nine amino acids:

EXAMPLE 52

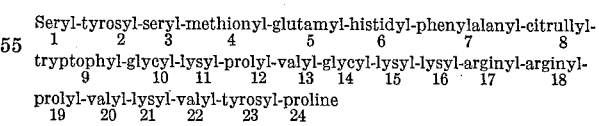

This twenty-four membered peptide is prepared in the following way: starting from the tetrapeptide L-phenylalanyl-L-citrullyl-L-tryptophyl-glycine (Example 23) (Sequence 7–10) and coupling this with a protected form of the dipeptide of Sequence 5–6 the hexapeptide of Sequence 5–10 (Example 36) is obtained. Similarly, after the necessary removal of protecting groups the hexapeptide (5–10) is combined with the tetrapeptide Sequence 1–4 to form the decapeptide 1–10. The latter is coupled to a nonapeptide of the Sequence 11–19 to give a nineteen membered peptide 1–19. In a similar way the Sequence 11–19 is combined also with the Sequence 20–24 to give the Sequence 11–24 and this latter is coupled with decapeptide of the Sequence 1–10 to form a twenty-four membered peptide 1–24. (Cf. H. Kappeler and R. Schwyzer, Helv. Chim. Acta. 44, 1136 (1961).)

EXAMPLE 53

*L-aspartyl-L-citrullyl-L-valyl-L-tyrosyl-L-isoleucyl-L-histidyl-L-prolyl-L-phenylalanine*

The dipeptide L-valyl-L-tyrosine protected and activated on the COOH is coupled to the dipeptide L-isoleucyl-L-histidine and the resulting protected tetrapeptide, after activation is coupled to the dipeptide L-prolyl-L-phenylalanine. The protecting group of the resulting hexapeptide is removed and the product coupled to the protected dipeptide L-aspartyl-L-citrulline by any one of the methods used in the preceding examples. The protecting groups of the resulting octapeptide are removed and the product, L-aspartyl-L-citrullyl-L-valyl-L-tryrosyl-L-isoleucyl-L-histidyl-L-prolyl-L-phenylanaline, is isolated in the usual way. (Cf. Schwarz, H.; Bumpus, F. M.; and Page, I. H.; J. Am. Chem. Soc., 79, 5697 (1957).)

This invention may be variously otherwise embodied within the scope of the appended claims.

What is claimed is:

1. A peptide of from two to twenty-four amino acids, at least one of which is citrulline.
2. A peptide of from two to twenty-four amino acids containing citrulline as the C-terminal amino acid.
3. A peptide containing citrulline as the N-terminal amino acid.
4. A peptide of the sequence of biological active peptides in which at least one amino acid selected from the group consisting of leucine, arginine and lysine is replaced by citrulline.
5. A compound selected from the group consisting of N α-benzyloxy-carbonyl-L-citrulline and esters thereof.
6. A dipeptide containing citrulline in the peptide chain.
7. A tripeptide containing citrulline in the peptide chain.
8. A tetrapeptide containing citrulline in the peptide chain.
9. A pentapeptide containing citrulline in the peptide chain.
10. L - histidyl - L - phenylalanyl - L - citrullyl - L - tryptophylglycine.
11. A hexapeptide containing citrulline in the peptide chain.
12. An octapeptide containing citrulline in the peptide chain.
13. A nonapeptide containing citrulline in the peptide chain.
14. A compound selected from the group consisting of L - cysteinyl - L - tyrosyl - L - phenylalanyl - L - glutaminyl - L - asparaginyl - L - cysteinyl - L - prolyl - L - citrullylglycinamide, protected forms thereof and the disulfide formed therefrom.
15. A compound selected from the group consisting of L - cysteinyl - L - tyrosyl - L - isoleucyl - L - glutaminyl - L - asparaginyl - L - cysteinyl - L - prolyl - L - citrullylglycinamide, protected forms thereof and the disulfide formed therefrom.
16. A compound seelcted from the group consisting of L - citrullyl - L - prolyl - L - prolyl - glycyl - L - phenylalanyl- L seryl - L - prolyl - L - phenylalanyl - L - arginine and the protected forms thereof.

References Cited by the Examiner

Rogers et al.: Nature, vol. 182, pages 186–7 (1958).

Klose ett al.: J. Biol. Chem., vol. 135, pages 153–5 (1940).

Katsoyannis et al.: J. Biol. Chem., vol. 233, pages 1352–4 (1958).

Silva et al.: Amer. J. Physiol, vol. 156, pages 261–273 (1942).

Konzett: Nature, vol. 188, page 998 (1960).

LEWIS GOTTS, *Primary Examiner.*

LEON ZITVER, *Examiner.*

D. P. CLARKE, P. A. STITH, *Assistant Examiners.*